Figure 1:
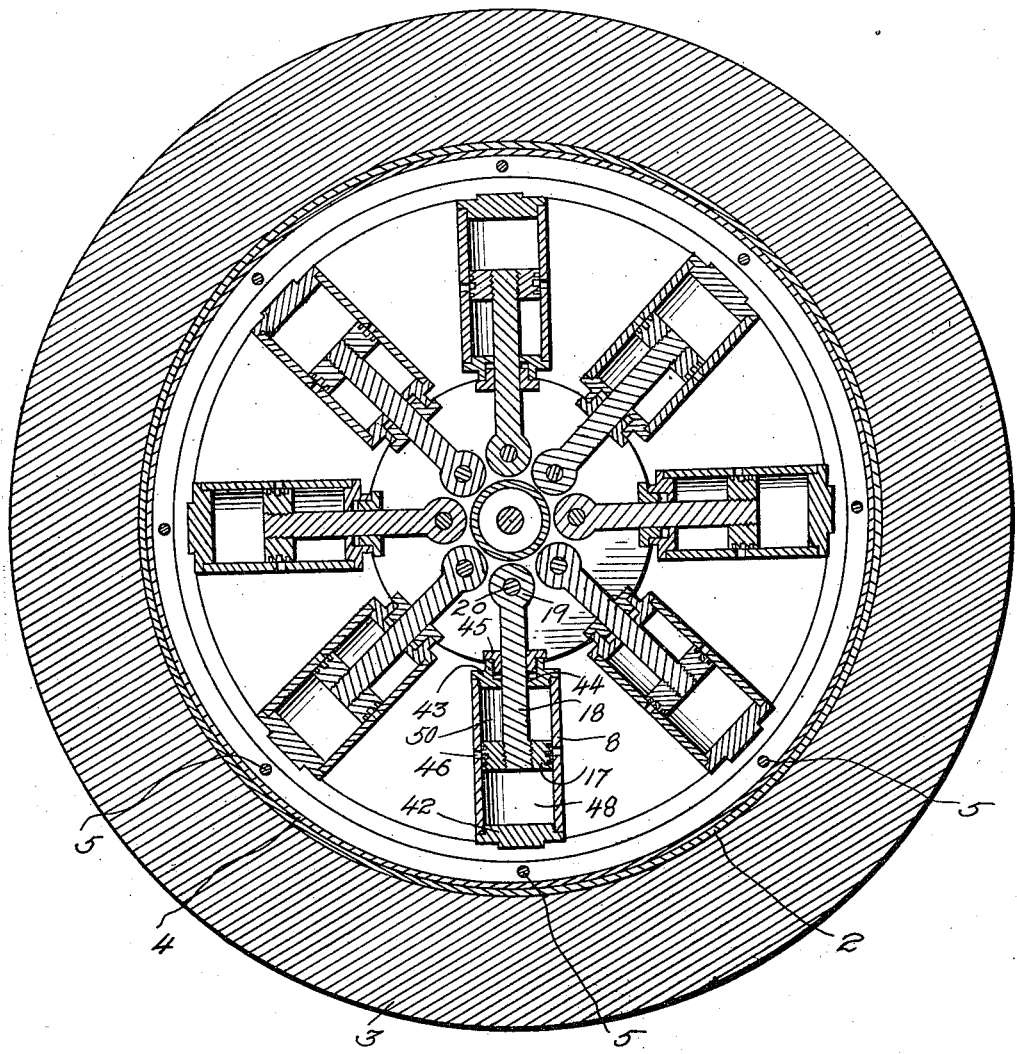

J. A. BORLAND.
WHEEL.
APPLICATION FILED FEB. 17, 1913.

1,144,996.

Patented July 6, 1915.
3 SHEETS—SHEET 1.

WITNESSES:
M. P. McKee
R. Kisluik.

INVENTOR
J. A. Borland
BY
Alex. J. Wedderburn, Jr.
ATTORNEY

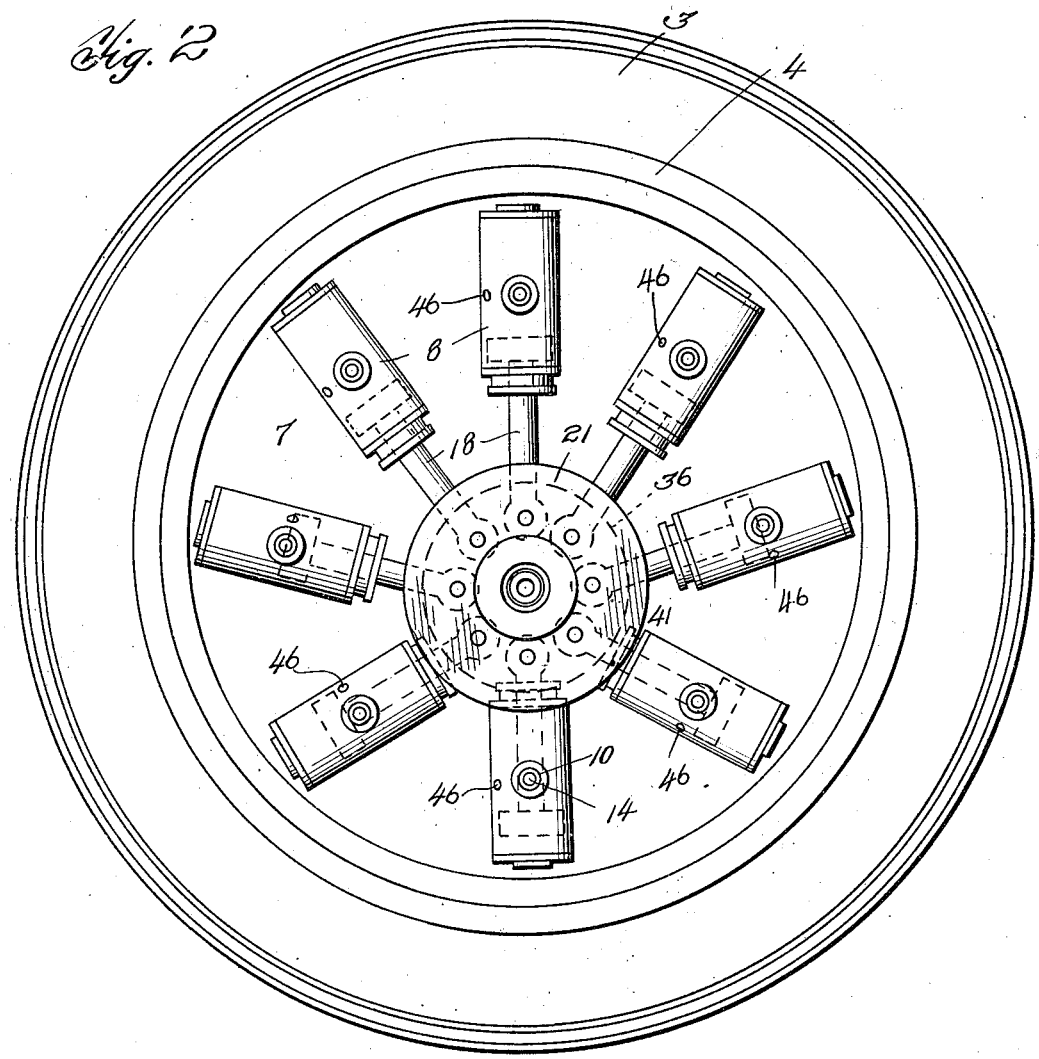
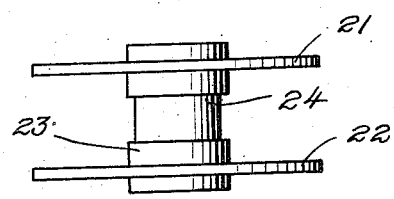

J. A. BORLAND.
WHEEL.
APPLICATION FILED FEB. 17, 1913.
1,144,996.
Patented July 6, 1915.
3 SHEETS—SHEET 3.
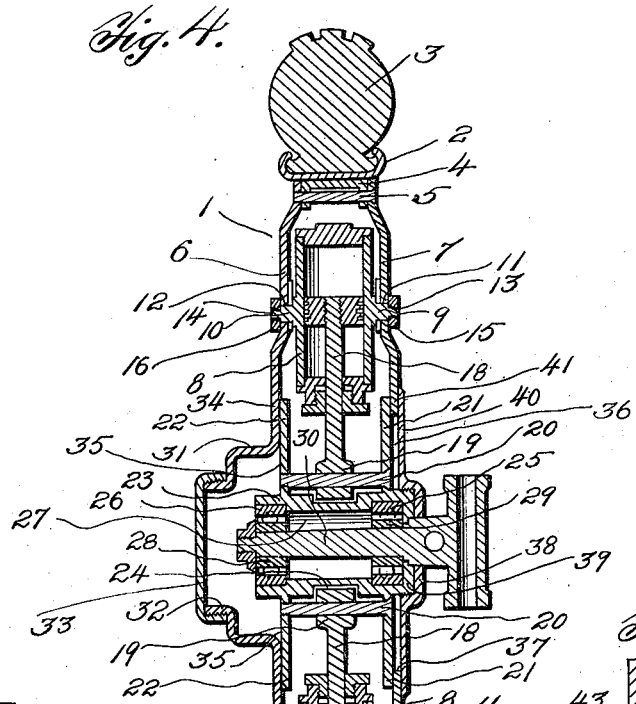
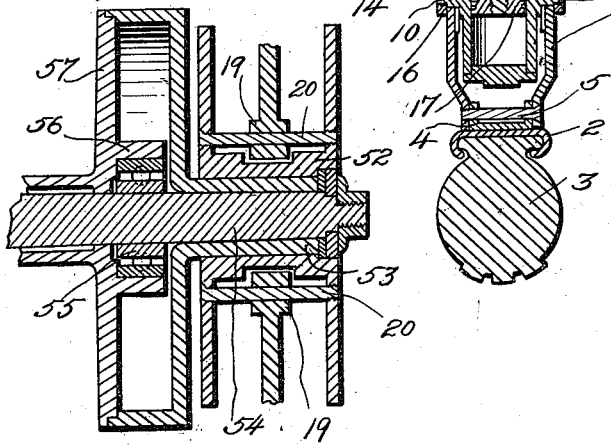
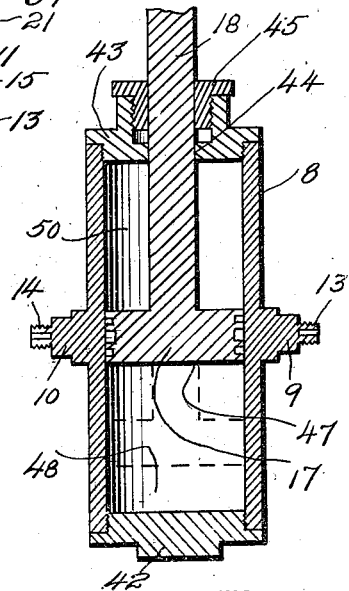
WITNESSES:
M. P. McKee
R. Kielink
INVENTOR
J. A. Borland
BY
Alex. J. Wedderburn, Jr.
ATTORNEY

UNITED STATES PATENT OFFICE.

JOHN ARCHIE BORLAND, OF CINCINNATI, OHIO, ASSIGNOR OF ONE-HALF TO POWEL CROSLEY, OF CINCINNATI, OHIO.

WHEEL.

1,144,996.   Specification of Letters Patent.   Patented July 6, 1915.

Application filed February 17, 1913. Serial No. 748,981.

*To all whom it may concern:*

Be it known that I, JOHN ARCHIE BORLAND, a citizen of the United States, residing at Cincinnati, in the county of Hamilton and State of Ohio, have invented certain new and useful Improvements in Wheels, of which the following is a specification.

This invention relates to improvements in wheels and has for its object to provide a wheel having a rim and hub held together entirely by air pressure.

Another object of the invention is to provide a wheel the hub of which is held thereto by piston rods operating in pivotally mounted cylinders.

Another object of the invention is to provide a resilient wheel the resiliency of which is obtained within the wheel altogether by air pressure and distributed around the entire circumference thereof.

With the above and other objects in view I have invented the device illustrated in the accompanying drawings in which—

Figure 1 is a vertical sectional view through my improved wheel, Fig. 2 is an elevational view of the wheel, the outer plates being removed, showing the relative position of the various parts when a heavy load is upon the hub, Fig. 3 is a plan view of a hub, Fig. 4 is a transverse sectional view of the wheel, Fig. 5 is a detail sectional view of a slightly modified hub construction, and Fig. 6 is an enlarged detail longitudinal sectional view of an air cylinder showing a piston and rod.

Like reference characters indicate like parts throughout the specification and in the several views in the drawings and 1 indicates a wheel consisting of a rim 2 to which is held the solid tire 3. To the opposing sides of the inner portion 4 of said rim 2 is secured by bolts 5 plates 6 and 7 which form a shell and which are fixedly held together by means of the pivotally mounted cylinders 8 having opposing projections 9 and 10 forming shafts which pivotally seat in the opposing openings 11 and 12 in the members 6 and 7 which form bearing for said shafts. The outer ends 13 and 14 of said shafts are reduced and screw threaded whereby said member 8 is held in position by means of the nuts 15 and 16. In each of said cylinders 8 are pistons 17 normally disposed centrally of said cylinders and which are connected to piston rods 18 the inner ends of which are formed with eyes 19 through which project the bolts 20 mounted in the opposing flanges 21 and 22 of the hub 23 which is provided with an annular channel 24 whereby said piston rods 18 are pivotally mounted as near as possible to said hub and still allowing sufficient play for pivotal movement of the rods. Ball races 25 and 26 are provided in the opposing ends of the passage 27, the inner members 28 and 29 of which form bearings for the axle end 30.

The plate 6 has its central portion 31 bent outward and screw threaded at the extreme outer part 32 thereof to receive the cap 33 so as to form the appearance of the common hub construction. The central vertically disposed portion 34 of the plate 6 contacts and is slidable against the outer surface 35 of the flange 22. In the inner plate 7 are enlarged central openings 36 so that the hub 23 will have sufficient movement without coming into contact with the edge 37 of said plate 7. A cap 38 is screwed to the inner end 39 of said hub, said cap having an enlarged annular flange 40 between which and said flange 21 the central portion 41 of said plate 7 is slidable.

The cylinders 8 are provided with screw caps 42 at their outer ends and screw caps 43 at their inner ends, which are provided with openings 44 through which the piston rods 18 project. On these caps 43 are packing glands 45 to prevent any escape of air from the inner part of said cylinders. Each of these cylinders 8 are provided with a centrally disposed opening 46 so that when the surface 47 of the piston 17 is inwardly of said opening, air will be admitted into the outer half 48 of the cylinder 8, and when the surface 49 of said piston is outwardly of said opening 46 air will be admitted into the inner half 50 of said cylinder. The piston, being of such a thickness that, when in a normally disposed central position in the cylinder it will project one inch in each direction from the center of the cylinder whereby air is maintained under pressure in each end thereof sufficient to hold the various cylinders and the hub in the normal position, as shown in Fig. 1 of the drawings, the pressure on the hub being distributed equally upon the three upper and lower cylinders shown in that figure, the two horizontally disposed cylinders being idle. But when an extraordinary weight is brought to bear upon the hub or shock on the wheel, forcing the hub out of center of the wheel as shown in Fig. 2, then the air pressure required to support the hub is distributed among all of the cylinders as shown in said Fig. 2, the air being compressed in the outer ends of the three lower cylinders and in the inner ends of the five upper cylinders.

In Fig. 5 is shown a slight modification of the hub construction in that the hub 52 is provided with a spindle 53 fixed thereon in which the axle 54 is rotatable, being supported in the ball race 55 in the box 56 formed by the member 57.

Having now described my device I wish it known that I do not limit myself to the exact construction but only to the extent of the scope of the following claims, which embody my invention and that which I claim to be new and desire to procure by Letters Patent is:—

1. A cushioning device consisting of a cylinder having a centrally disposed port, a piston operating in said cylinder and adapted to normally close said port.

2. A cushioning device consisting of a cylinder having a centrally disposed port, a piston operating in said cylinder and adapted to normally close said port, said piston being adapted to hold air under pressure in both ends of said cylinder.

3. In a wheel having a rim and hub, cylinders having pistons therein forming a connection between said hub and rim, said cylinders having inlet ports disposed centrally thereof, said pistons when in a normal position adapted to close said ports, said pistons when in a normal position adapted to hold air under pressure in the opposing ends of said cylinders.

4. In a wheel having a rim and hub, cylinders having pistons therein forming a connection between said hub and rim, said cylinders having inlet ports disposed centrally thereof, said pistons when in a normal position adapted to hold air under pressure in the opposing ends of said ports, said hub having opposing annular flanges forming a recess therebetween, said pistons having rods pivoted in said recess, and opposing plates connecting said rim and hub between which said hub is movable.

5. In a wheel having a rim and hub, cylinders having pistons therein forming a connection between said hub and rim, said cylinders having inlet ports disposed centrally thereof, said pistons when in a normal position adapted to close said ports, said hub having opposing annular flanges forming a recess therebetween, said pistons having rods pivoted in said recess, and opposing plates connecting said rim and hub between which said hub is movable, and against which said flanges are slidable.

6. In a wheel having a rim and hub, cylinders having pistons therein forming a connection between said hub and rim, said cylinders having inlet ports disposed centrally thereof, said pistons when in a normal position adapted to close said ports, said hub having opposing annular flanges forming a recess therebetween, said pistons having rods pivoted in said recess, and opposing plates connecting said rim and hub between which said hub is movable, and against which said flanges are slidable, one of said plates being formed in two parts.

7. A wheel, a hub therefor, means whereby said hub is held suspended within said wheel by compressed air, said means consisting of cylinders and pistons, piston rods pivotally connected to said hub, said cylinders being pivotally mounted, opposing plates upon which said cylinders are mounted, said cylinders being suspended inwardly of the rim of said wheel, said pistons adapted to compress air in either end of said cylinders, said cylinders having central air inlets.

8. A wheel, a hub therefor, means whereby said hub is held suspended within said wheel by compressed air, said means consisting of cylinders and pistons, piston rods pivotally connected to said hub, said cylinders being pivotally mounted, opposing plates upon which said cylinders are mounted, said cylinders being suspended inwardly of the rim of said wheel, said pistons adapted to compress air in either end of said cylinders, said cylinders having central air inlets, said pistons adapted to normally close said inlets and hold air compressed in each end of said cylinders whereby said hub is normally centered in said wheel.

9. A wheel, a hub therefor, means whereby said hub is held suspended within said wheel by compressed air, said means consisting of cylinders and pistons, piston rods pivotally connected to said hub, said cylinders being pivotally mounted, opposing plates upon which said cylinders are mounted, said cylinders being suspended inwardly of the rim of said wheel, said pistons adapted to compress air in either end of said cylinders, said cylinders having central air inlets, said pistons adapted to normally close said inlets and hold air compressed in each end of said cylinders whereby said hub is normally centered in said wheel, said hub having opposing flanges, said plates being slidable on said flanges.

10. A wheel, a hub therefor, means whereby said hub is held suspended within said wheel by compressed air, said means consisting of cylinders and pistons, piston rods pivotally connected to said hub, said cylinders being pivotally mounted, opposing plates upon which said cylinders are mounted, said cylinders being suspended inwardly of the rim of said wheel, said pistons adapted to compress air in either end of said cylinders, said cylinders having central air inlets, said pistons adapted to normally close said inlets and hold air compressed in each end of said cylinders whereby said hub is normally centered in said wheel, said hub having opposing flanges, said plates being slidable on said flanges, bolts mounted in said flanges upon which said rods are mounted.

11. A wheel consisting of a rim, opposing vertically disposed plates connected thereto, a hub movable within said plates, cylinders pivoted to said plates, and pistons in said cylinders and connected to said hub whereby said hub is suspended, said pistons adapted to be held normally in the center of said cylinders, said pistons adapted to hold air under compression in both ends of said cylinders, said cylinders having centrally disposed inlet ports.

12. A wheel consisting of a rim, opposing vertically disposed plates connected thereto, a hub movable within said plates, cylinders pivoted to said plates, and pistons in said cylinders and connected to said hub whereby said hub is suspended, said pistons adapted to be held normally in the center of said cylinders, said pistons adapted to hold air under compression in both ends of said cylinders, said cylinders having centrally disposed inlet ports, said pistons adapted to normally close said ports.

In testimony whereof I affix my signature in presence of two witnesses.

JOHN ARCHIE BORLAND.

Witnesses:
ANNA BORLAND,
L. E. ORR.

Copies of this patent may be obtained for five cents each, by addressing the "Commissioner of Patents, Washington, D. C."